United States Patent
Feng et al.

(10) Patent No.: US 12,044,796 B2
(45) Date of Patent: Jul. 23, 2024

(54) METHOD AND APPARATUS FOR IDENTIFYING BEHAVIOR OF TARGET, AND RADAR SYSTEM

(71) Applicant: Huawei Technologies Co., Ltd., Shenzhen (CN)

(72) Inventors: Xiangbing Feng, Shanghai (CN); Yueqin Yu, Chengdu (CN); Xueming Peng, Shanghai (CN); Qi Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 638 days.

(21) Appl. No.: 17/188,106

(22) Filed: Mar. 1, 2021

(65) Prior Publication Data
US 2021/0190912 A1 Jun. 24, 2021

Related U.S. Application Data

(63) Continuation of application No. PCT/CN2020/085139, filed on Apr. 16, 2020.

(30) Foreign Application Priority Data

Aug. 30, 2019 (CN) .......................... 201910817089.3

(51) Int. Cl.
*G01S 7/41* (2006.01)
*G01S 7/35* (2006.01)

(52) U.S. Cl.
CPC .............. *G01S 7/415* (2013.01); *G01S 7/352* (2013.01); *G01S 7/356* (2021.05); *G01S 7/417* (2013.01)

(58) Field of Classification Search
CPC ........ G01S 7/415; G01S 7/417; G01S 7/2883; G01S 7/356; G01S 13/723; G01S 13/88
(Continued)

(56) References Cited

U.S. PATENT DOCUMENTS

| 4,954,963 A | * | 9/1990 | Penz | ........................ | G01S 7/417 706/30 |
| 5,638,281 A | * | 6/1997 | Wang | ....................... | G01S 7/021 342/29 |

(Continued)

FOREIGN PATENT DOCUMENTS

| CN | 106127110 A | 11/2016 |
| CN | 106250854 A | 12/2016 |

(Continued)

OTHER PUBLICATIONS

Xu Wei et al.,"Pedestrian recognition algorithm based on vision and millimeter wave radar information fusion", Journal of Tongji University (Natural Science), vol. 45, Suppl.1, Dec. 2017, with an English abstract, 7 pages.

(Continued)

*Primary Examiner* — Vladimir Magloire
*Assistant Examiner* — Michael W Justice
(74) *Attorney, Agent, or Firm* — Conley Rose, P.C.

(57) ABSTRACT

A method and apparatus for identifying behavior of a target, and a radar system applied to an automated driving scenario include receiving a radar echo signal from a target, processing the radar echo signal to obtain time-frequency domain data, processing the time-frequency domain data to obtain signal attribute feature data representing a first feature of a radar echo signal attribute and linear prediction coefficient (LPC) feature data representing a second feature of the radar echo signal, inputting the signal attribute feature data and the LPC feature data into a behavior identification model, and outputting behavior information of the target.

20 Claims, 5 Drawing Sheets

(58) Field of Classification Search
USPC .................................. 342/195, 192, 196
See application file for complete search history.

(56) References Cited

U.S. PATENT DOCUMENTS

| | | | |
|---|---|---|---|
| 5,999,118 A | 12/1999 | Hethuin et al. | |
| 7,423,581 B2* | 9/2008 | Fujikawa | G01S 7/2923 |
| | | | 342/159 |
| 7,924,212 B2* | 4/2011 | Benitez | G01S 13/88 |
| | | | 342/28 |
| 8,682,821 B2* | 3/2014 | Benitez | G01S 13/867 |
| | | | 342/28 |
| 9,520,051 B1* | 12/2016 | Zack | G08B 25/016 |
| 9,568,594 B2* | 2/2017 | Harash | G01S 13/89 |
| 9,568,595 B2* | 2/2017 | Zack | A61B 5/7282 |
| 9,576,468 B2* | 2/2017 | Zack | H04B 1/7163 |
| 9,733,350 B2* | 8/2017 | Stainvas Olshansky | |
| | | | G01S 13/931 |
| 10,037,671 B2* | 7/2018 | Zack | G08B 25/016 |
| 10,108,903 B1* | 10/2018 | Piao | G08B 13/2494 |
| 10,310,073 B1* | 6/2019 | Santra | A61B 5/0816 |
| 10,310,087 B2* | 6/2019 | Laddha | G01S 7/4808 |
| 10,365,350 B2* | 7/2019 | Kamo | G01S 7/417 |
| 10,473,756 B2* | 11/2019 | Nakayama | G01S 7/292 |
| 10,495,725 B2* | 12/2019 | Zhang | G01S 13/003 |
| 10,576,328 B2* | 3/2020 | Santra | G01S 13/42 |
| 10,621,847 B2* | 4/2020 | Zack | G08B 21/0446 |
| 10,838,057 B2* | 11/2020 | Schuck | G01S 13/583 |
| 10,901,069 B2* | 1/2021 | Otsuki | G08B 21/0423 |
| 10,934,764 B2* | 3/2021 | Rafrafi | G01S 7/415 |
| 11,023,718 B2* | 6/2021 | Lin | G06V 40/103 |
| 11,067,667 B2* | 7/2021 | Rafrafi | G01S 7/415 |
| 11,364,931 B2* | 6/2022 | Lu | G06N 3/045 |
| 11,378,673 B2* | 7/2022 | Schuck | G01S 13/583 |
| 11,391,819 B2* | 7/2022 | Sarkis | G01S 7/417 |
| 11,531,110 B2* | 12/2022 | Lu | G01S 17/931 |
| 11,594,011 B2* | 2/2023 | Lu | G01S 17/89 |
| 11,651,326 B2* | 5/2023 | Abebe | G06Q 10/04 |
| | | | 706/12 |
| 11,734,472 B2* | 8/2023 | Dolan | G06F 30/27 |
| | | | 703/8 |
| 2006/0082493 A1* | 4/2006 | Fujikawa | G01S 7/2923 |
| | | | 342/159 |
| 2011/0032139 A1* | 2/2011 | Benitez | G01S 13/56 |
| | | | 342/28 |
| 2011/0257536 A1 | 10/2011 | Ser et al. | |
| 2012/0106298 A1* | 5/2012 | Liu | G06V 40/20 |
| | | | 367/87 |
| 2012/0249360 A1 | 10/2012 | Kanamoto | |
| 2013/0041856 A1* | 2/2013 | Benitez | G01S 13/867 |
| | | | 342/28 |
| 2014/0266860 A1* | 9/2014 | Blumrosen | G01S 15/89 |
| | | | 367/87 |
| 2016/0003939 A1* | 1/2016 | Stainvas Olshansky | |
| | | | G01S 13/06 |
| | | | 342/146 |
| 2016/0223651 A1* | 8/2016 | Kamo | G01S 13/426 |
| 2016/0377704 A1* | 12/2016 | Harash | G01S 13/0209 |
| | | | 342/21 |
| 2016/0377705 A1* | 12/2016 | Zack | A61B 5/7282 |
| | | | 342/21 |
| 2016/0379462 A1* | 12/2016 | Zack | G08B 21/0453 |
| | | | 340/539.12 |
| 2016/0379474 A1* | 12/2016 | Zack | G01S 13/0209 |
| | | | 340/539.11 |
| 2016/0379475 A1* | 12/2016 | Zack | G08B 21/043 |
| | | | 342/21 |
| 2017/0358301 A1 | 12/2017 | Raitio et al. | |
| 2018/0011169 A1* | 1/2018 | Nakayama | G01S 13/42 |
| 2018/0106889 A1* | 4/2018 | Schuck | F41G 5/08 |
| 2018/0136326 A1* | 5/2018 | Schuck | G01S 13/583 |
| 2018/0284223 A1* | 10/2018 | Otsuki | G01S 7/412 |
| 2018/0330593 A1* | 11/2018 | Zack | G01S 13/89 |
| 2018/0348374 A1* | 12/2018 | Laddha | G01S 17/931 |
| 2019/0162010 A1* | 5/2019 | Rafrafi | B60J 5/101 |
| 2019/0162821 A1* | 5/2019 | Rafrafi | G01S 7/417 |
| 2019/0162822 A1* | 5/2019 | Rafrafi | B60Q 9/00 |
| 2019/0178980 A1* | 6/2019 | Zhang | A61B 5/7267 |
| 2019/0187261 A1* | 6/2019 | Peso Parada | G10K 9/12 |
| 2019/0240535 A1* | 8/2019 | Santra | G01C 22/00 |
| 2019/0295282 A1* | 9/2019 | Smolyanskiy | G06F 18/22 |
| 2020/0025877 A1* | 1/2020 | Sarkis | G01S 7/412 |
| 2020/0184027 A1* | 6/2020 | Dolan | G01S 13/931 |
| 2020/0320286 A1* | 10/2020 | Lin | G01S 7/415 |
| 2021/0263140 A1* | 8/2021 | Schuck | G01S 7/415 |
| 2021/0311168 A1* | 10/2021 | Rafrafi | G01S 13/56 |
| 2021/0354718 A1* | 11/2021 | Lu | G01S 7/497 |
| 2021/0365712 A1* | 11/2021 | Lu | G01S 7/4802 |
| 2021/0373161 A1* | 12/2021 | Lu | G06T 7/579 |

FOREIGN PATENT DOCUMENTS

| | | |
|---|---|---|
| CN | 107358250 A | 11/2017 |
| CN | 108388850 A | 8/2018 |
| CN | 108614993 A | 10/2018 |
| CN | 108920993 A | 11/2018 |
| CN | 109065070 A | 12/2018 |
| CN | 109188414 A | 1/2019 |
| CN | 109313898 A | 2/2019 |
| CN | 106814351 A | 4/2019 |
| CN | 109765539 A | 5/2019 |
| CN | 109917347 A | 6/2019 |
| JP | H0464080 A | 2/1992 |
| JP | 2012163403 A | 8/2012 |
| JP | 2016070701 A | 5/2016 |
| JP | 2017026475 A | 2/2017 |

OTHER PUBLICATIONS

Gurbuz, S., et al., "Operational assessment and adaptive selection of micro-Doppler features," IET Radar, Sonar & Navigation, vol. 9, No. 9, 2015, 9 pages.

Javier, R., et al., "Application of Linear Predictive Coding for Human Activity Classification Based on Micro-Doppler Signatures," IEEE Geoscience and Remote Sensing Letters, vol. 11, No. 10, Oct. 2014, pp. 1831-1834.

Lee, C., et la., "Moving Object Classifier based on UWB Radar Signal," 6 pages.

* cited by examiner

METHOD AND APPARATUS FOR IDENTIFYING BEHAVIOR OF TARGET, AND RADAR SYSTEM

CROSS-REFERENCE TO RELATED APPLICATIONS

This application is a continuation of International Patent Application No. PCT/CN2020/085139 filed on Apr. 16, 2020, which claims priority to Chinese Patent Application No. 201910817089.3 filed on Aug. 30, 2019. The disclosures of the aforementioned applications are hereby incorporated by reference in their entireties.

TECHNICAL FIELD

This application relates to the field of communications technologies, and in particular, to a method and apparatus for identifying behavior of a target, and a radar system.

BACKGROUND

As a new technology emerging in recent years, human behavior identification has attracted extensive attention in fields such as video surveillance, automated driving, intelligent human-computer interaction, and intelligent traffic early warning.

Commonly used human behavior identification technologies are implemented based on image acquisition and image processing. That is, images of pedestrians are captured by an image capturing device, and target identification is performed on the captured images to obtain a target image of each pedestrian, and feature extraction is performed on each target image based on a feature extraction algorithm, to obtain feature data corresponding to the pedestrian. Finally, the obtained feature data corresponding to each pedestrian is input to a pre-trained behavior identification model, and an output of the behavior identification model is behavior information of the pedestrian, such as running or walking.

The foregoing human behavior identification technology based on image acquisition and image processing may be easily affected by light rays, the line of sight of the image capturing device, and the like, resulting in low identification accuracy.

SUMMARY

To resolve the problem of low accuracy of behavior identification, embodiments of this application provide a method and apparatus for identifying behavior of a target, and a radar system. The technical solutions are as follows.

According to a first aspect, a method for identifying behavior of a target is provided, where the method includes receiving a radar echo signal reflected by a target, processing the radar echo signal to obtain time-frequency domain data, processing the time-frequency domain data to obtain signal attribute feature data and linear prediction coefficient (LPC) feature data, where the signal attribute feature data is used to represent a feature of the radar echo signal attribute, and the LPC feature data is used to represent a feature of the radar echo signal, and inputting the signal attribute feature data and the LPC feature data into a behavior identification model, and outputting behavior information of the target.

According to the solution in this embodiment of this application, a transmit antenna of a radar system continuously transmits radar signals based on a pulse repetition period, that is, the transmit antenna of the radar system continuously transmits modulated radar signals at different frequencies in each pulse repetition period, where the pulse repetition period may also be referred to as a frequency sweep period. After a radar signal is reflected by the target, a receive antenna receives the radar signal, where the received radar signal is a radar echo signal. When processing radar echo signals, the radar system may process all radar echo signals that are received in a predetermined behavior identification period. One behavior identification period includes a predetermined quantity of pulse repetition periods.

After receiving the radar echo signal reflected by the target, the radar system mixes the received radar echo signal with the radar signal transmitted when the radar echo signal is received, to obtain a beat signal. Then, N-point sampling is performed on an analog signal of the beat signal, and the N-point sampled analog signal is converted into a digital signal using an analog-to-digital (A/D) converter. For each pulse repetition period, M-point fast Fourier transformation (FFT) may be performed on the beat signal after A/D conversion, that is, frequency domain data of M points can be obtained. The frequency domain data obtained for each point may be expressed in a form of a complex number. For the obtained frequency domain data of the M points, if an amplitude of a signal in a spectrum diagram corresponding to the frequency domain data is greater than a predetermined value, it is considered that the frequency domain data of the point is obtained from the radar echo signal reflected by the target. Then, the frequency domain data of the point may be used as the frequency domain data of the target. The frequency domain data in one behavior identification period is accumulated to obtain the frequency domain data of the target in one behavior identification period, where the frequency domain data of the target in one behavior identification period is a one-dimensional vector. Then, a short time Fourier transform (STFT) may be performed on the frequency domain data of the target in one behavior identification period to obtain time-frequency domain data of the target in one behavior identification period, where the time-frequency domain data of the target in one behavior identification period is a two-dimensional matrix.

Then, the signal attribute feature data and the LPC feature data of the target are calculated based on the time-frequency domain data of the target in one behavior identification period, where the signal attribute feature data is used to represent a feature of the radar echo signal attribute, and the LPC feature data is used to represent a feature of the radar echo signal.

Finally, the obtained signal attribute feature data and LPC feature data of the target are inputted into the behavior identification model to obtain the behavior information of the target. The behavior information may be running, walking, jumping, or the like. The behavior identification model can be a machine learning model obtained through training based on a large quantity of training samples.

In this embodiment of this application, radar is used to detect a target. Because an electromagnetic wave transmitted by the radar is less affected by factors such as light and weather, the radar detects the target more accurately such that the feature data of the target that is obtained through analysis based on the radar echo signal is more accurate. Then, the finally determined behavior information of the target is more accurate.

In a possible implementation, processing the time-frequency domain data to obtain signal attribute feature data and LPC feature data includes processing the time-frequency domain data to obtain the signal attribute feature data, and inputting the time-frequency domain data into an LPC function to obtain the LPC feature data.

According to the solution shown in this embodiment of this application, the radar system can process the time-frequency domain data to obtain the signal attribute feature data. Then, the LPC feature data can be obtained using the LPC function. The LPC function may be as follows:

$$x(n) = u(n) \cdot H(z) = \sum_{r=1}^{P} a_r x(n-r) + Gu(n),$$

where $a_r$ is an LPC, u(n) is an input sequence, that is, an amplitude value of the time-frequency domain data, x(n) is an output sequence of the LPC function, x(n−r) is an output sequence that is of the LPC function and that is obtained in P behavior identification periods before a current behavior identification period, where r=1, 2, 3 . . . P, and $$\sum_{r=1}^{P} a_r x(n-r)$$

is a linear prectiction value $\hat{x}(n)$ of the output sequence. An unknown coefficient in this LPC function is $a_r$. A minimum mean square error criterion may be used to calculate $a_r$. The obtained $a_r$ is the LPC feature data.

In a possible implementation, before processing the time-frequency domain data to obtain signal attribute feature data and LPC feature data, the method further includes performing dimension reduction on the time-frequency domain data.

According to the solution shown in this embodiment of this application, dimension reduction may be performed on the time-frequency domain data of the target, and then the feature data can be calculated based on the dimension-reduced time-frequency domain data. In this way, the amount of time-frequency domain data can be reduced, the calculation of the feature data can be accelerated, and the efficiency of identifying behavior of a target can be improved.

In a possible implementation, performing dimension reduction on the time-frequency domain data of each target includes performing dimension reduction on the time-frequency domain data of each target based on a principal component analysis (PCA) algorithm.

In the solution shown in this embodiment of this application, dimension reduction is performed on the time-frequency domain data based on the PCA algorithm.

In a possible implementation, the signal attribute feature data includes one or more of a maximum frequency value, a mean value of amplitude, a standard deviation of amplitude value, a mean absolute error of amplitude value, an amplitude value quartile, an amplitude value interquartile range, a spectral entropy, amplitude value skewness, and amplitude value kurtosis.

In the solution shown in this embodiment of this application, the maximum frequency value is a maximum Doppler frequency value in a time-frequency spectrogram corresponding to the time frequency domain data. The mean value of amplitude is an average value of all amplitude values corresponding to the time-frequency domain data. The standard deviation of amplitude value is a standard deviation of all the amplitude values corresponding to the time-frequency domain data. The average absolute error of amplitude value is an average absolute error of all the amplitude values corresponding to the time-frequency domain data. The amplitude value quartile means that the amplitude values corresponding to the time-frequency domain data are arranged from small to large and divided into four equal parts, and the amplitude values at the three points of division are respectively referred to as a 25% quartile, a 50% quartile, and a 75% quartile. The amplitude value interquartile range refers to a difference between the 75% quartile and the 25% quartile. The amplitude value skewness is a measure of a direction and degree of skewness of amplitude value distribution, and is a digital feature of a degree of asymmetry of the amplitude value distribution. The amplitude value kurtosis is a digital feature reflecting peak values at positions of average values of a probability density distribution curve corresponding to amplitude values. The spectral entropy represents a relationship between a power spectrum corresponding to time-frequency domain data and an entropy rate.

In a possible implementation, the behavior identification model is a support-vector machines (SVM) classifier model.

In the solution shown in this embodiment of this application, the behavior identification model may be an SVM classification model. During classification of behavior information, the SVM classification model can be used to classify the behavior information into only two types. To finally obtain a combination of a plurality of types of behavior information of a target, a plurality of SVM classification models can be combined for use. That is, a first SVM can classify the behavior information of the target into two types first, and a second SVM can classify the two types of behavior information to obtain subtypes corresponding to each type, and so on in order to obtain a combination of a plurality of types of behavior information. It can be learned that a combination of a plurality of types of behavior information of a target can be obtained by combining a plurality of SVM classification models, that is, the obtained behavior information of the target is more comprehensive.

According to a second aspect, an apparatus for identifying behavior of a target is provided, where the apparatus includes a receiving module configured to receive a radar echo signal reflected by a target, a processing module configured to process the radar echo signal to obtain time-frequency domain data, and process the time-frequency domain data to obtain signal attribute feature data and LPC feature data, where the signal attribute feature data is used to represent a feature of the radar echo signal attribute, and the LPC feature data is used to represent a feature of the radar echo signal, and an identification module configured to input the signal attribute feature data and the LPC feature data into a behavior identification model, and output behavior information of the target.

In a possible implementation, the processing module is configured to process the time-frequency domain data to obtain the signal attribute feature data, and input the time-frequency domain data into an LPC function to obtain the LPC feature data.

In a possible implementation, the processing module is further configured to perform dimension reduction on the time-frequency domain data.

In a possible implementation, the processing module is configured to perform dimension reduction on the time-frequency domain data of each target based on a PCA algorithm.

In a possible implementation, the signal attribute feature data includes one or more of a maximum frequency value, a mean value of amplitude, a standard deviation of amplitude value, a mean absolute error of amplitude value, an amplitude value quartile, an amplitude value interquartile range, a spectral entropy, amplitude value skewness, and amplitude value kurtosis.

In a possible implementation, the behavior identification model is a SVM classifier model.

According to a third aspect, a radar system is provided, where the radar system includes a signal transmitting apparatus, a signal receiving apparatus, and a signal processing apparatus. The signal transmitting apparatus is configured to transmit a radar signal. The signal receiving apparatus is configured to receive a radar echo signal reflected back by a target when the radar signal contacts the target. The signal processing apparatus is configured to process the radar echo signal received by the signal receiving apparatus, to obtain time-frequency domain data, process the time-frequency domain data to obtain signal attribute feature data and LPC feature data, where the signal attribute feature data is used to represent a feature of the radar echo signal attribute, and the LPC feature data is used to represent a feature of the radar echo signal, and input the signal attribute feature data and the LPC feature data into a behavior identification model, and output behavior information of the target.

According to a fourth aspect, a computer-readable storage medium is provided, where the computer-readable storage medium includes an instruction, and when the computer-readable storage medium runs on a computer, the computer is enabled to perform the method for identifying behavior of a target according to the first aspect.

The technical solutions provided in the embodiments of this application bring the following beneficial effects.

The radar echo signal reflected by the target is received, the radar echo signal is processed to obtain the signal attribute feature data and the LPC feature data of the target, and then the signal attribute feature data and the LPC feature data of the target are input into the behavior identification model to obtain the behavior information of the target. Because the radar signal transmitted by the radar is less affected by light, weather, and the like, a plurality of types of feature data of the target that are obtained based on the radar echo signal are more accurate, and further, the finally obtained behavior information is more accurate.

DESCRIPTION OF EMBODIMENTS

An embodiment of this application provides a method for identifying behavior of a target. The method can be implemented by a radar system and is applied in scenarios such as automated driving, intelligent human-computer interaction, and intelligent traffic early warning. Using automated driving as an example, the radar system may be a vehicle-mounted radar system, and the radar system can identify behavior of a pedestrian in front of a vehicle to determine whether there is a danger, and whether an emergency braking or deceleration process should be performed. For example, when a pedestrian crosses a guardrail in front of the vehicle and approaches the vehicle, the vehicle may immediately perform the emergency braking process to avoid collision.

Figure 1:
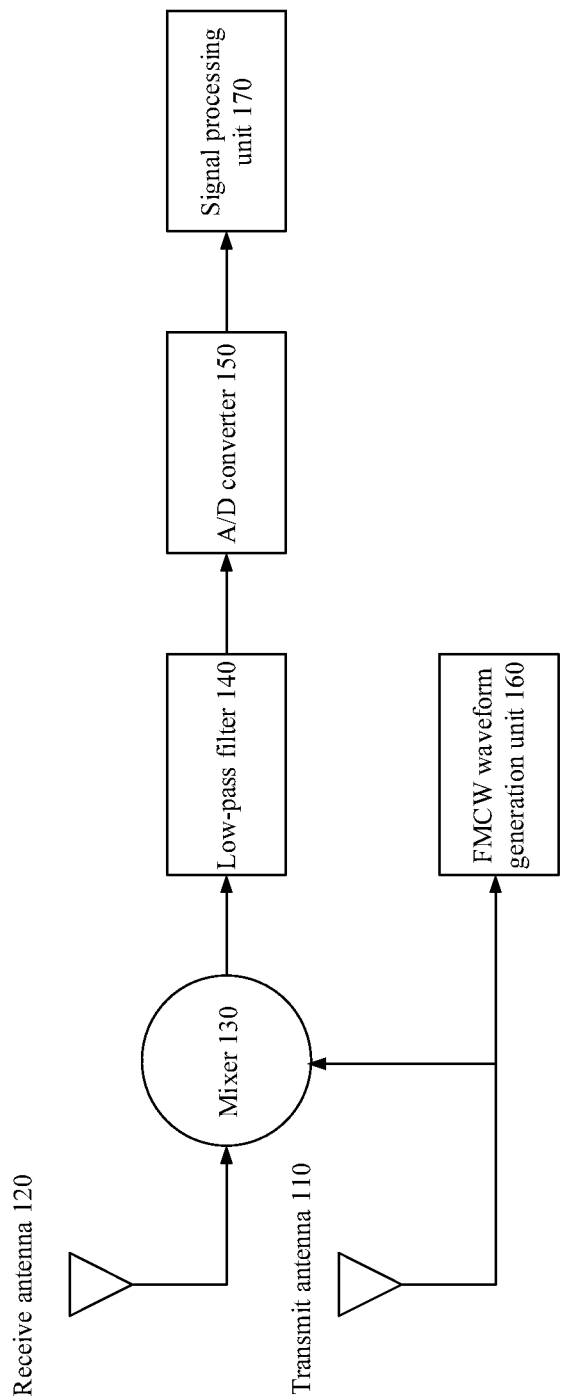
FIG. 1 is a schematic architectural diagram of a frequency-modulated continuous-wave (FMCW) radar system according to an embodiment of this application.

The foregoing radar system may be an FMCW radar system, and the radar signal transmitted by the FMCW radar system in this embodiment of this application may be a sawtooth wave, a triangular wave, a trapezoidal wave, or the like. The radar system transmits a radar signal to the outside. After contacting a target, the radar signal is reflected back by the target, and is received by the radar system. Generally, the radar signal reflected by the target may be referred to as a radar echo signal. After receiving the radar echo signal, the radar system may analyze the radar echo signal to extract feature data of the radar echo signal, and then determine current behavior information of the target, such as running, walking, or crossing, based on the feature data. FIG. 1 is a schematic architectural diagram of an FMCW radar system.

The FMCW radar system may include a signal transmitting apparatus, a signal receiving apparatus, and a signal processing apparatus. The signal transmitting apparatus may include a transmit antenna 110 and an FMCW waveform generation unit 160. The signal receiving apparatus may include a receive antenna 120. The signal processing apparatus may include a mixer 130, a low-pass filter 140, an A/D converter 150, and a signal processing unit 170. The transmit antenna 110 is configured to transmit a radar signal. The receive antenna 120 is configured to receive a radar echo signal. The mixer 130 is configured to mix the received radar echo signal and the transmitted radar signal to obtain a beat signal, where the beat signal may also be referred to as a differential frequency signal or an intermediate frequency signal. The low-pass filter 140 is configured to filter out unwanted high-frequency signals from the mixed beat signals. The A/D converter 150 is configured to convert an analog signal of an electromagnetic wave into a digital signal for subsequent processing. The FMCW waveform generation unit 160 is configured to generate a to-be-transmitted radar signal, and the FMCW waveform generation unit 160 may include an FMCW waveform generator and an oscillator. The signal processing unit 170 may include a processor and a memory, where the processor is configured to perform feature extraction on the beat signal to obtain feature data of a target, and obtain behavior information of the target based on the feature data, and the memory is configured to store intermediate data, result data, and the like generated during processing of the beat signal for subsequent viewing.

Figure 2:
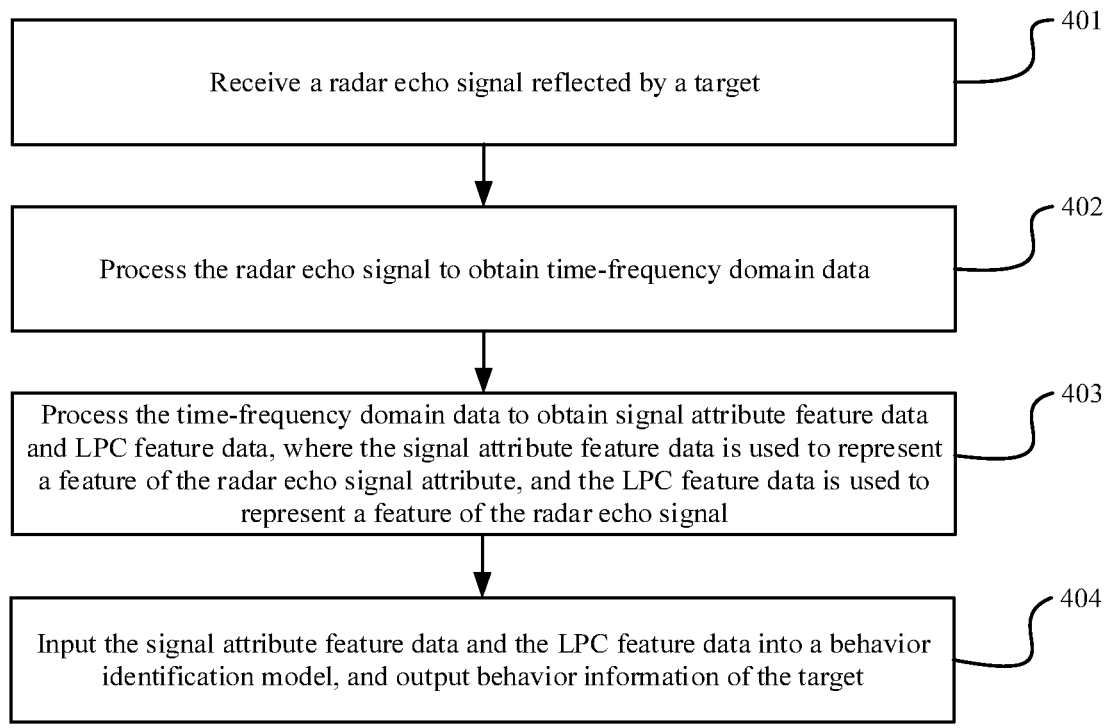
FIG. 2 is a flowchart of a method for identifying behavior of a target according to an embodiment of this application.

An embodiment of this application provides a method for identifying behavior of a target. As shown in FIG. 2, the processing procedure of the method may include the following steps.

Step 201: Receive a radar echo signal reflected by a target.

Figure 3:
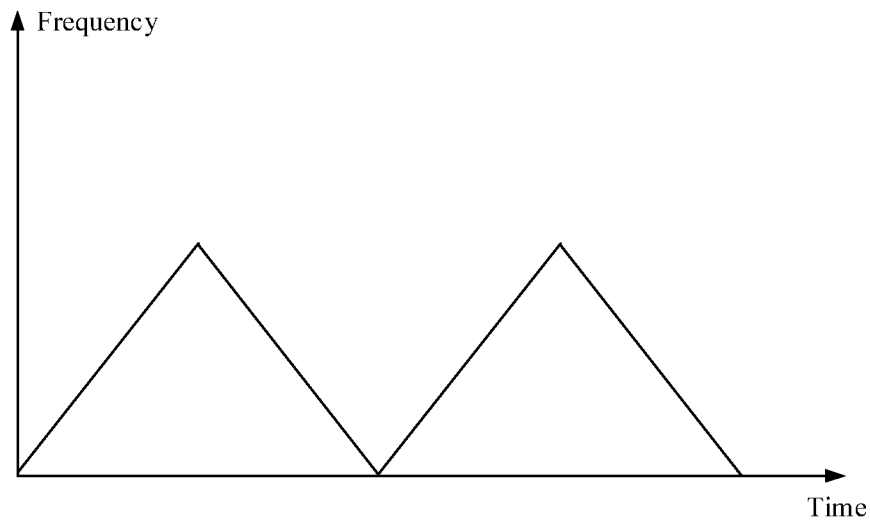
FIG. 3 is a schematic diagram of a frequency variation pattern of a radar signal transmitted by a radar system according to an embodiment of this application.

During implementation, a radar system may transmit radar signals based on a pulse repetition period, that is, a transmit antenna of the radar system continuously transmits modulated radar signals at different frequencies in each pulse repetition period, where the pulse repetition period may also be referred to as a frequency sweep period. The frequency variation pattern of the transmitted radar signal may also vary according to a requirement. FIG. 3 illustrates an example of the frequency variation pattern of the radar signals transmitted by the radar system. After contacting a target, a radar signal is reflected back by the target, and is received by a receive antenna of the radar system. The radar signal that is received by the receive antenna and that is reflected back by the target may be referred to as a radar echo signal.

Step 202: Process the radar echo signal to obtain time-frequency domain data.

Figure 4:
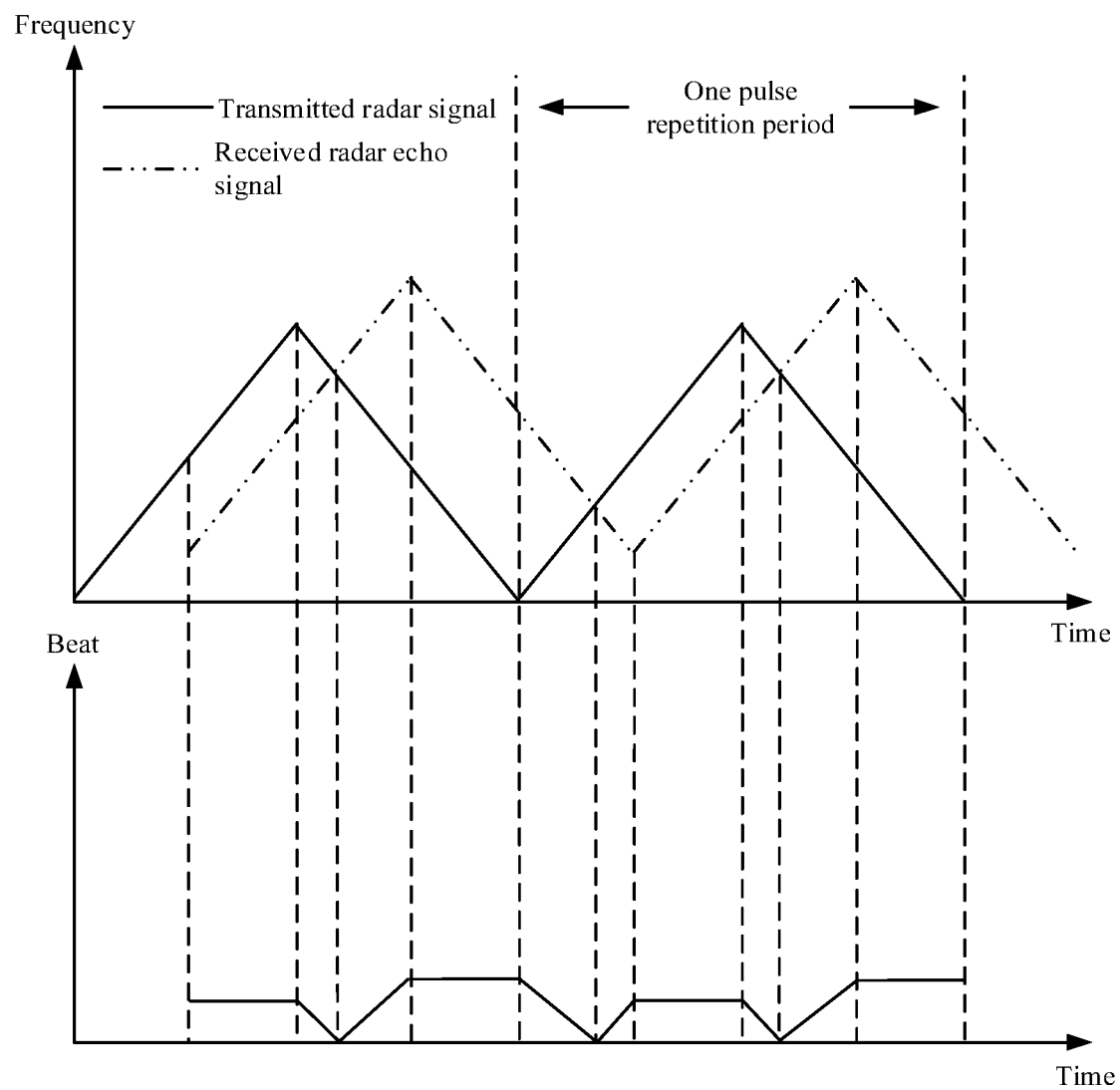
FIG. 4 is a schematic diagram of a radar signal transmitted by a radar system, a radar echo signal received by the radar system, and a beat signal that is obtained through mixing according to an embodiment of this application.

During implementation, the radar system may use a mixer to mix the received radar echo signal and the radar signal to be transmitted when the radar echo signal is received, to obtain a beat signal corresponding to the radar echo signal. FIG. 4 is a schematic diagram of a radar signal transmitted by a radar system, an echo signal received by the radar system, and a beat signal obtained through mixing in a pulse repetition period. After the radar system obtains a beat signal corresponding to each pulse repetition period through mixing, an A/D conversion is performed on the beat signal to obtain an N-point sampled digital signal. Then, the beat signals corresponding to the A pulse repetition periods may be used as a beat signal of a frame.

In a scenario in which behavior of a single target needs to be identified, for each pulse repetition period, M-point FFT may be performed on the beat signal after the A/D conversion, that is, frequency domain data of M points may be obtained, and the frequency domain data obtained at each point may be expressed in a form of a complex number, for example, ai+b. For the obtained frequency domain data of the M points, if an amplitude of a signal in a spectrum diagram corresponding to the frequency domain data is greater than a predetermined value, it is considered that the frequency domain data of the point is obtained from the radar echo signal reflected by the target. Then, the frequency domain data of the point may be used as the frequency domain data of the target.

In addition, beat signals corresponding to A pulse repetition periods may be used as a beat signal of a frame, and beat signals of B frames may be used as a beat signal of a behavior identification period. Then, for the frequency domain data of the target in one behavior identification period, the frequency domain data of the target obtained from each pulse repetition period in the behavior identification period can be accumulated to obtain the frequency domain data $S_i$ of the target in the behavior identification period, where $S_i$ is a one-dimensional vector of 1×AB, and each element in the vector represents a complex number of the frequency domain data of a point.

Then, time-frequency domain analysis may be performed on the frequency domain data $S_i$ of the target in one behavior identification period to obtain corresponding time-frequency domain data. The time-frequency domain analysis may be performing an STFT on the frequency domain data of the target in one behavior identification period, that is, a predetermined window function and the frequency domain data are multiplied, and then a W-point FFT is performed on the frequency domain data such that the time-frequency domain data $Q_i$ corresponding to the frequency domain data of the target in one behavior identification period can be obtained. Because W-point FFT can be performed on the frequency domain data with a size of AB for C times, $Q_i$ is a two-dimensional matrix of W×C, and each element in the matrix represents a complex number of time-frequency domain data of a point. The value of C is determined by a length of a sliding window, and C≤AB/W.

In a scenario in which behavior of a plurality of targets needs to be identified. For each pulse repetition period, M-point FFT is performed on the beat signal after A/D conversion to obtain M-point frequency domain data, and a plurality of signal amplitudes in the spectrum diagram corresponding to the M-point frequency domain data may be greater than a predetermined value such that it is considered that the M-point frequency domain data is obtained from radar echo signals reflected by different targets. Then, for a pulse repetition period, the target may appear in different pulse repetition periods, and therefore, the target matching algorithm may be used for the frequency domain data in two different pulse repetition periods to determine the frequency domain data of the same target. An example of common target matching algorithms is a Kalman filtering method. After determining the frequency domain data of the same target in one behavior identification period, the time-frequency domain analysis performed on the frequency domain data of the target in the scenario in which behavior of a single target needs to be identified may be performed on the frequency domain data of each target.

Step 203: Process the time-frequency domain data to obtain signal attribute feature data and LPC feature data.

The signal attribute feature data is used to represent a feature of the radar echo signal attribute, and the LPC feature data is used to represent a feature of the radar echo signal.

During implementation, corresponding signal attribute feature data and LPC feature data can be determined for the time-frequency domain data of each target. Determining of the signal attribute feature data and the LPC feature data is described below.

For determining of the frequency feature data, the frequency feature data may include one or more of a maximum frequency value, a mean value of amplitude, a standard deviation of amplitude value, a mean absolute error of amplitude value, an amplitude value quartile, an amplitude value interquartile range, a spectral entropy, amplitude value skewness, and amplitude value kurtosis in the frequency domain data. Before the frequency feature data is calculated, the time-frequency domain data $Q_i$ may be converted into a one-dimensional row vector $R_i$, and then amplitude values of the converted time-frequency domain data are obtained, that is, a modulo operation is performed on each element in $R_i$ is obtained, and the modulo operation formula may be as follows:

$$\|R_i\|=\text{abs}(R_i).$$

For example, if an element in a two-dimensional matrix corresponding to the time-frequency domain data is a complex number ai+b, the modulo of the element is $\sqrt{a^2+b^2}$.

A method for calculating each piece of frequency feature data is described below.

(1) For the maximum frequency value, that is, a maximum Doppler frequency value in the time-frequency spectrogram corresponding to the time frequency domain data, the calculation formula may be as follows:

$$FT_{i,1}=f_{i,max}=\max(f_{d,n}),$$

where $FT_{i,1}$ represents the first piece of signal attribute feature data corresponding to the time-frequency domain data, and $f_{d,n}$ represents a Doppler frequency set in the $i^{th}$ piece of time-frequency domain data.

Other pieces of signal attribute feature data other than the maximum frequency value may be calculated based on the time-frequency domain data $\|R_i\|$ that is obtained after the modulo operation is performed and a calculation method is described below.

(2) For the mean value of amplitude, the calculation formula may be as follows:

$$FT_{i,2} = m(\|R_i\|) = \frac{1}{W \cdot C} \sum_{j=1}^{W \cdot C} \|R_{i,j}\|,$$

where $FT_{i,2}$ represents the second piece of signal attribute feature data corresponding to the time-frequency domain data, and $\|R_{i,j}\|$ is the amplitude value of the $j^{th}$ element in $R_i$.

(3) For the standard deviation of amplitude value, the calculation formula may be as follows:

$$FT_{i,3} = STD_i = \sqrt{\frac{1}{W \cdot C - 1} \sum_{j=1}^{W \cdot C} (\|R_{i,j}\| - m(\|R_i\|))^2},$$

where $FT_{i,3}$ represents the third piece of signal attribute feature data corresponding to the time-frequency domain data.

(4) For the mean absolute error of amplitude value, the calculation formula may be as follows:

$$FT_{i,4} = MAD_i = \frac{1}{W \cdot C} \sum_{j=1}^{W \cdot C} |(\|R_{i,j}\| - m(\|R_i\|))|,$$

where $FT_{i,4}$ represents the fourth piece of signal attribute feature data corresponding to the time-frequency domain data.

(5) The amplitude value quartile means that amplitude values are arranged from small to large and divided into four equal parts, and the amplitude values at the three points of division are the amplitude value quartiles. $\|R^i\|$ is arranged from small to large based on $\mathrm{sort}(\|R_i\|)$, and the positions used to divide $\|R_i\|$ into four equal parts are denoted as a, b, and c, which may be referred to as a 25% quartile, a 50% quartile, and a 75% quartile, respectively. A formula for calculating the 25% quartile may be as follows:

$$FT_{i,5} = \mathrm{Qua}_i = \mathrm{sort}(\|R_i\|)_a,$$

where $FT_{i,5}$ represents the fifth piece of signal attribute feature data corresponding to the time-frequency domain data.

(6) The amplitude value interquartile range indicates a difference between the 75% quartile c and the 25% quartile a, and the calculation formula may be as follows:

$$FT_{i,6} = IQR_i = \mathrm{sort}(\|R_i\|)_c - \mathrm{Qua}_i,$$

where $FT_{i,6}$ represents the sixth piece of signal attribute feature data corresponding to the time-frequency domain data.

(7) The amplitude value skewness is a measure of a direction and degree of skewness of amplitude value distribution, and is a digital feature of a degree of asymmetry of the amplitude value distribution, and the calculation formula may be as follows:

$$FT_{i,7} = \mathrm{Skew}_i = \frac{\frac{1}{W \cdot C}\sum_{j=1}^{W \cdot C}(\|R_{i,j}\| - m(\|R_i\|))^3}{\left[\frac{1}{W \cdot C}\sum_{j=1}^{W \cdot C}(\|R_{i,j}\| - m(\|R_i\|))^2\right]^{3/2}},$$

where $FT_{i,7}$ represents the seventh piece of signal attribute feature data corresponding to the time-frequency domain data.

(8) The amplitude value kurtosis is a digital feature reflecting peak values at positions of average values of a probability density distribution curve corresponding to amplitude values, and the calculation formula may be as follows:

$$FT_{i,8} = \mathrm{Kuro}_i = \frac{\frac{1}{W \cdot C}\sum_{j=1}^{W \cdot C}(\|R_{i,j}\| - m(\|R_i\|))^4}{\left[\frac{1}{W \cdot C}\sum_{j=1}^{W \cdot C}(\|R_{i,j}\| - m(\|R_i\|))^2\right]^2},$$

where $FT_{i,8}$ represents the eighth piece of signal attribute feature data corresponding to the time-frequency domain data.

(9) The spectral entropy represents a relationship between a power spectrum corresponding to time-frequency domain data and an entropy rate, and the calculation formula may be expressed as follows:

$$FT_{i,9} = SE_i = \int_{-\pi}^{\pi} \log(\|R_i\|(\omega))d\omega,$$

where $\|R_i\|(\omega) = FFT(\|R_i\|)$, and $FT_{i,9}$ represents the ninth piece of signal attribute feature data corresponding to the time-frequency domain data.

The LPC feature data corresponding to the time-frequency domain data can be obtained based on the LPC function. The LPC function may be as follows:

$$x(n) = u(n) \cdot H(z) = \sum_{r=1}^{P} a_r x(n-r) + Gu(n),$$

where $a_r$ is an LPC, $u(n)$ is an input sequence, that is, $\|R_i\|$ corresponding to the time-frequency domain data, $x(n)$ is an output sequence of the LPC function, $x(n-r)$ is an output sequence that is of the LPC function and that is obtained in P behavior identification periods before a current behavior identification period, where r=1, 2, and 3 . . . P, and $$\sum_{r=1}^{P} a_r x(n-r)$$

is a linear prediction value $\hat{x}(n)$ of the output sequence. An unknown coefficient in this LPC function is $a_r$. A minimum mean square error criterion may be used to calculate $a_r$. That is, a difference between the output sequence and the linear prediction value is defined as a linear prediction error, and the calculation formula may be as follows:

$$e(n) = x(n) - \hat{x}(n) = x(n) - \sum_{r=1}^{P} a_r x(n-r),$$

A secondary prediction error E can be further obtained through calculation, and the calculation formula may be as follows:

$$E = \Sigma_W e^2(n) = \Sigma_W w[x(n) - \hat{x}(n)]^2,$$

In each of the foregoing formulas, the value of P can be determined based on an actual requirement. To ensure that the final behavior identification is more accurate, a relatively large value of P can be used, for example, P=6. Then, for the formula used for calculating the secondary error E, $a_1$ to $a_6$ that minimize E can be calculated, that is, six LPCs are the LPC feature data corresponding to the time domain data, and the six LPCs can be represented as $FT_{i,10}$ to $FT_{i,15}$.

Therefore, for a target, the feature data of the signal of the target may be expressed as $FT_i=[FT_{i,1}, FT_{i,2}, \ldots FT_{i,15}]$.

In a possible implementation, to reduce the amount of data during feature extraction, correspondingly, dimension reduction may be performed on the time-frequency domain data before the time-frequency domain data is processed.

During implementation, based on the processing in step 202, it can be learned that the time-frequency domain data $Q_i$ of the target is a two-dimensional matrix of W×C, then, dimension reduction may be performed on each piece of $Q_i$ to reduce the amount of data. The dimension reduction processing may be performed based on a PCA dimension reduction algorithm, a singular value decomposition algorithm, a manifold learning algorithm, or the like. The dimension reduction based on the PCA algorithm is described below.

For the time-frequency domain data $Q_i$ of the target, q(l) is a one-dimensional vector of the $l^{th}$ row in, where l=1, 2 . . . W, the value of q(l) is 1×C, and the covariance matrix may be calculated based on the following calculation formula:

$$\sum = \frac{1}{W}\sum_{l=1}^{W}(q(l))^T(q(l)),$$

where the covariance matrix Σ is a square matrix of C×C. Then, eigenvalues and eigenvectors of the covariance matrix are calculated, and the eigenvectors corresponding to the largest K eigenvalues are selected, where K is one dimension of the dimension-reduced time-frequency domain data, and W is another dimension of the reduced-dimensional time-frequency domain data, where K<<C. Then, the amount of the reduced-dimensional time-frequency domain data is much less than that of the time-frequency domain data before the dimension reduction. A mapping matrix $M_i$ is constructed based on the eigenvectors corresponding to the K eigenvalues, and a matrix of time-frequency domain data with an initial size of W×C is converted into a matrix with a size of W×K based on the mapping matrix $M_i$. The conversion formula may be $T_i=Q_iM_i$.

It should be noted that the processing performed on the time-frequency domain data of the target in step 203 may be performed on the dimension-reduced time-frequency domain data $T_i$ of the target.

Step 204: Input the signal attribute feature data and the LPC feature data into a behavior identification model, and output behavior information of the target.

The behavior identification model may be an SVM classification model, or may be a neural network model. For ease of description, the signal attribute feature data and the LPC feature data of the target are collectively referred to as the feature data of the target.

During implementation, the feature data that is of the target and that is obtained through the foregoing processing may be input into a pre-trained behavior identification model to obtain the behavior information of the target, for example, walking, running, moving away, approaching, crossing a load, or diagonally crossing a road. The following description is based on an example in which the behavior identification model is an SVM classification model.

Figure 5:
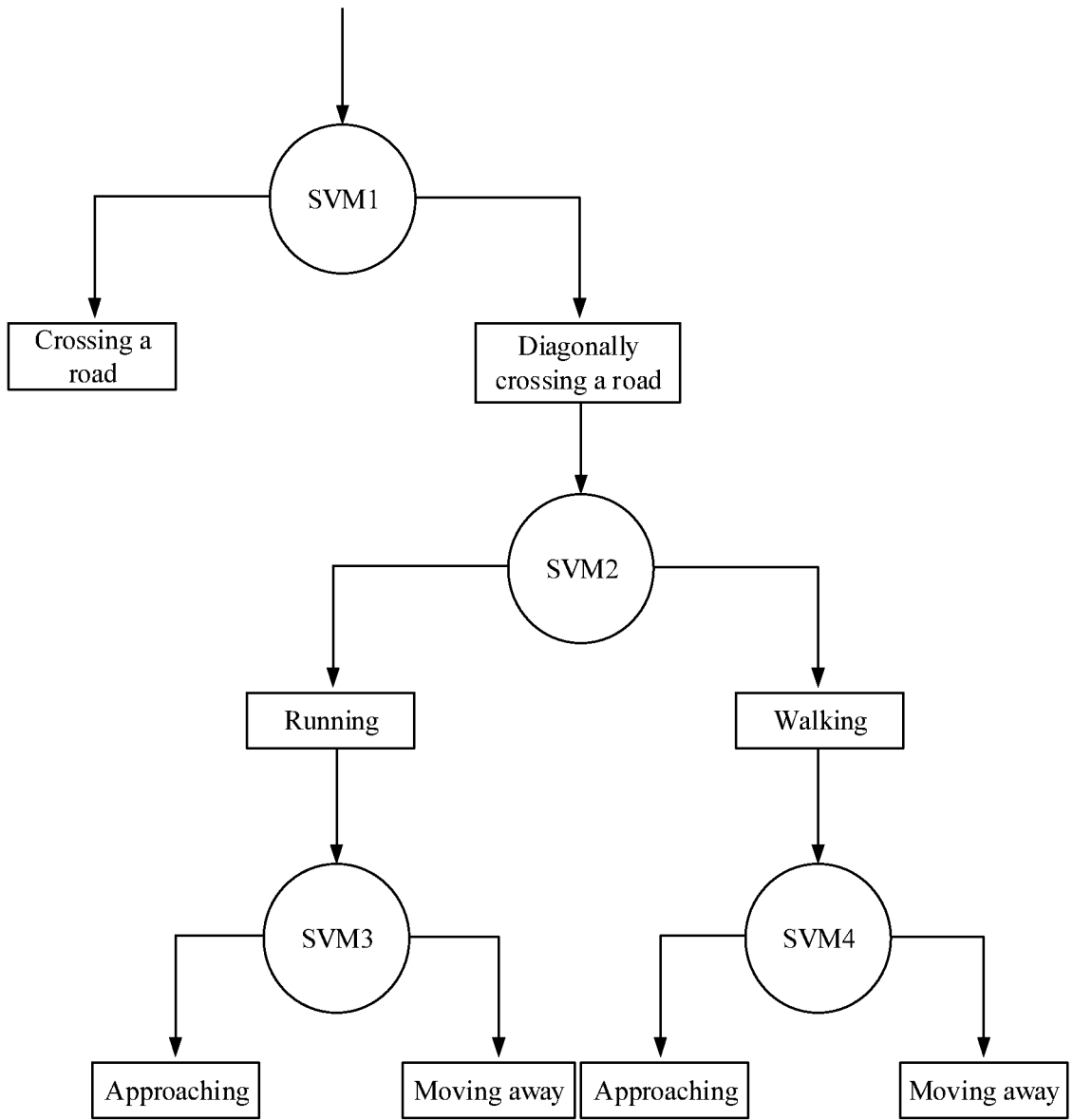
FIG. 5 is a schematic structural diagram of an SVM classification model according to an embodiment of this application.

During classification of behavior information, the SVM classification model can be used to classify the behavior information into only two types. To finally obtain a combination of a plurality of types of behavior information of a target, a plurality of SVM classification models can be combined for use. That is, a first SVM can classify the behavior information of the target into two types first, and a second SVM can classify the two types of behavior information to obtain subtypes corresponding to each type, and so on in order to obtain a combination of a plurality of types of behavior information. FIG. 5 is a schematic diagram of a combination of a plurality of SVM classification models. In FIG. 5, the behavior information is first divided into crossing a road and diagonally crossing a road, then diagonally crossing a road is divided into running and walking, and then running and walking are equally divided into approaching and moving away, where both approaching and moving away refer to a positional relationship between a target and a radar system. When the combination of a plurality of SVM classification models shown in FIG. 5 is used to identify behavior of a target, the feature data that is of the target and that is obtained in the foregoing steps is input to SVM1, and if the obtained behavior information is diagonally crossing a road, the feature data is input to SVM2, and the obtained behavior information is walking or running. Then, if the behavior information obtained based on SVM2 is running, the feature data is input to SVM3, and the obtained behavior information is approaching o moving away, or if the behavior information obtained based on SVM2 is walking, the feature data is input to SVM4, and the obtained behavior information is approaching or moving away. Certainly, after SVM2 is provided, SVM3 and SVM4 may not be provided, but only SVM5 may be provided, that is, the foregoing feature information may be input to SVM5 regardless of whether the behavior information obtained based on SVM2 is running or walking, and the obtained behavior information is approaching or moving away. For a more convenient representation, a number may be assigned to each combination of behavior information such that a combination of behavior information of a target obtained by a combination of a plurality of SVM classification models is represented by a number. Table 1 shows correspondences between combinations of behavior information and numbers.

TABLE 1

| Combination of behavior information | Number |
|---|---|
| Crossing a load | 0 |
| Diagonally crossing a road, walking, and approaching | 1 |
| Diagonally crossing a road, walking, and moving away | −1 |
| Diagonally crossing a road, running, and approaching | 2 |
| Diagonally crossing a road, running, and moving away | −2 |
| . . . | . . . |

It should be noted herein that only a few examples of the behavior information obtained based on the behavior identification model are listed above, and because the behavior identification model can be trained using different samples, different behavior information may be identified based on the behavior identification model. In addition, it should be noted that the processing procedure in step 201 and step 203 may be used as a method for obtaining feature data of a target in a process of identifying behavior of the target in actual application, or may be used as a method for obtaining feature data of a sample in training samples. When the processing procedure in step 201 and step 203 is used as a method for obtaining the feature data of a sample in training samples, after the feature data of a target in a behavior identification period is obtained, X pieces of feature data in X behavior identification periods can be continuously obtained and used as a sample feature dataset to train the behavior identification model. To improve accuracy of the trained behavior identification model, X can be a relatively large value, for example, tens of thousands, hundreds of thousands, or even a larger value.

Figure 6:
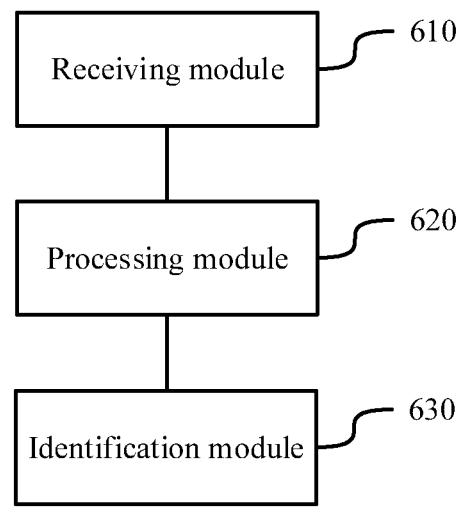
FIG. 6 is a schematic structural diagram of an apparatus for identifying behavior of a target according to an embodiment of this application.

Based on the same technical concept, an embodiment of this application further provides a behavior identification apparatus. As shown in FIG. 6, the apparatus includes a receiving module 610, a determining module 620, and an identification module 630.

The receiving module 610 is configured to receive a radar echo signal reflected by a target. Further, the receiving module 610 can implement the function of receiving the radar echo signal in step 201, and other implicit steps.

The processing module 620 is configured to process the radar echo signal to obtain time-frequency domain data, and process the time-frequency domain data to obtain signal attribute feature data and LPC feature data, where the signal attribute feature data is used to represent a feature of the radar echo signal attribute, and the LPC feature data is used to represent a feature of the radar echo signal. Further, the processing module 620 can implement the function of processing the radar echo signal in step 202, the function of processing the time-frequency domain data in step 203, and other implicit steps.

The identification module 630 is configured to input the signal attribute feature data and the LPC feature data into a behavior identification model, and output behavior information of the target. Further, the identification module 630 can implement the function of determining behavior information of the target in step 204, and other implicit steps.

In a possible implementation, the processing module 620 is configured to process the time-frequency domain data to obtain the signal attribute feature data, and input the time-frequency domain data into an LPC function to obtain the LPC feature data.

In a possible implementation, the processing module 620 is further configured to perform dimension reduction on the time-frequency domain data.

In a possible implementation, the processing module 620 is configured to perform dimension reduction on the time-frequency domain data of each target based on a PCA algorithm.

In a possible implementation, the signal attribute feature data includes one or more of a maximum frequency value, a mean value of amplitude, a standard deviation of amplitude value, a mean absolute error of amplitude value, an amplitude value quartile, an amplitude value interquartile range, a spectral entropy, amplitude value skewness, and amplitude value kurtosis.

In a possible implementation, the behavior identification model is an SVM SVM classifier model.

It may be noted that when the apparatus for identifying behavior of a target provided in the foregoing embodiments are identifying behavior of the target, division of the foregoing function modules is taken only as an example for illustration. In actual application, the foregoing functions can be allocated to different function modules and implemented according to a requirement, that is, an inner structure of the radar system is divided into different function modules to implement all or part of the functions described above. In addition, the apparatus for identifying behavior of a target provided in the foregoing embodiment and the embodiment of the method for identifying behavior of a target belong to the same concept. For a detailed implementation process of the apparatus, reference may be made to the method embodiment, and details are not described herein again.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the foregoing embodiments of this application are all or partially generated. The computer instructions may be stored in a computer-readable storage medium. The computer-readable storage medium may be any usable medium accessible by a device, or a data storage device integrating one or more usable media. The usable medium may be a magnetic medium (for example, a floppy disk, a hard disk, a magnetic tape, or the like), an optical medium (for example, a digital versatile disc (DVD), or the like), a semiconductor medium (for example, a solid-state drive, or the like).

A person of ordinary skill in the art may understand that all or some of the steps of the embodiments may be implemented by hardware or a program instructing related hardware. The program may be stored in a computer-readable storage medium. The storage medium may include a read-only memory (ROM), a magnetic disk, or an optical disc.

The foregoing descriptions are merely specific embodiments of this application, but are not intended to limit this application. Any modification, equivalent replacement, or improvement made without departing from the spirit and principle of this application should fall within the protection scope of this application.

What is claimed is:
1. A method comprising:
receiving a radar echo signal from a target;
processing the radar echo signal to obtain time-frequency domain data;
processing the time-frequency domain data to obtain signal attribute feature data representing a first feature of a radar echo signal attribute, wherein the signal attribute feature data comprises one or more of a maximum frequency value corresponding to the time-frequency domain data, a standard deviation of amplitude value corresponding to the time-frequency domain data, a mean absolute error of amplitude value corresponding to the time-frequency domain data, an amplitude value quartile, an amplitude value interquartile range, and a spectral entropy;
processing the time-frequency domain data to obtain linear prediction coefficient (LPC) feature data representing a second feature of the radar echo signal, wherein processing the time-frequency domain data comprises:
re-arranging the time-frequency domain data to obtain a one-dimensional row vector; and
inputting the re-arranged time-frequency domain data into an LPC function to obtain the LPC feature data;

inputting the signal attribute feature data and the LPC feature data into a behavior identification model; and obtaining, from an output of the behavior identification model, behavior information of the target.

2. The method of claim 1, wherein before processing the time-frequency domain data, the method further comprises performing a dimension reduction on the time-frequency domain data.

3. The method of claim 2, further comprising performing the dimension reduction on the time-frequency domain data based on a principal component analysis (PCA) algorithm.

4. The method of claim 1, wherein the behavior identification model is a support-vector machines (SVM) classifier model.

5. The method of claim 1, wherein the behavior identification model is a neural network model.

6. An apparatus comprising:
a receiver configured to receive a radar echo signal from a target;
a processor coupled to the receiver and configured to:
process the radar echo signal to obtain time-frequency domain data;
process the time-frequency domain data to obtain signal attribute feature data representing a first feature of a radar echo signal attribute, wherein the signal attribute feature data comprises one or more of a maximum frequency value corresponding to the time-frequency domain data, a standard deviation of amplitude value corresponding to the time-frequency domain data, a mean absolute error of amplitude value corresponding to the time-frequency domain data, an amplitude value quartile, an amplitude value interquartile range, and a spectral entropy;
process the time-frequency domain data to obtain linear prediction coefficient (LPC) feature data representing a second feature of the radar echo signal, wherein in a manner to process the time-frequency domain data, the processor is further configured to:
re-arrange the time-frequency domain data to obtain a one-dimensional row vector; and
input the re-arranged time-frequency domain data into an LPC function to obtain the LPC feature data;
input the signal attribute feature data and the LPC feature data into a behavior identification model; and
obtain, from an output of the behavior identification model, behavior information of the target.

7. The apparatus of claim 6, wherein the processor is further configured to perform a dimension reduction on the time-frequency domain data.

8. The apparatus of claim 7, wherein the processor is further configured to perform the dimension reduction on the time-frequency domain data based on a principal component analysis (PCA) algorithm.

9. The apparatus of claim 6, wherein the behavior identification model is a support-vector machines (SVMs) classifier model.

10. The apparatus of claim 6, wherein the behavior identification model is a neural network model.

11. A radar system comprising:
a signal transmitting apparatus configured to transmit a radar signal;
a signal receiving apparatus configured to receive a radar echo signal reflected from a target when the radar signal contacts the target; and
a signal processing apparatus coupled to the signal transmitting apparatus and the signal receiving apparatus and configured to:
process the radar echo signal to obtain time-frequency domain data;
process the time-frequency domain data to obtain signal attribute feature data representing a first feature of a radar echo signal attribute, wherein the signal attribute feature data comprises one or more of a maximum frequency value corresponding to the time-frequency domain data, a standard deviation of amplitude value corresponding to the time-frequency domain data, a mean absolute error of amplitude value corresponding to the time-frequency domain data, an amplitude value quartile, an amplitude value interquartile range, and a spectral entropy;
process the time-frequency domain data to obtain linear prediction coefficient (LPC) feature data representing a second feature of the radar echo signal, wherein in a manner to process the time-frequency domain data, the processor is further configured to:
re-arrange the time-frequency domain data to obtain a one-dimensional row vector; and
input the re-arranged time-frequency domain data into an LPC function to obtain the LPC feature data;
input the signal attribute feature data and the LPC feature data into a behavior identification model; and
obtain, from an output of the behavior identification model, behavior information of the target.

12. The radar system of claim 11, wherein the signal processing apparatus is further configured to perform a dimension reduction on the time-frequency domain data based on a principal component analysis (PCA) algorithm.

13. The radar system of claim 11, wherein the behavior identification model is a support-vector machines (SVM) classifier model.

14. The radar system of claim 11, wherein the behavior identification model is a neural network model.

15. The radar system of claim 11, wherein the signal processing apparatus is further configured to perform a dimension reduction on the time-frequency domain data.

16. A computer program product comprising computer-executable instructions stored on a non-transitory computer-readable storage medium that, when executed by a processor, cause an apparatus to:
receive a radar echo signal from a target;
process the radar echo signal to obtain time-frequency domain data;
process the time-frequency domain data to obtain signal attribute feature data representing a first feature of a radar echo signal attribute, wherein the signal attribute feature data comprises one or more of a maximum frequency value corresponding to the time-frequency domain data, a standard deviation of amplitude value corresponding to the time-frequency domain data, a mean absolute error of amplitude value corresponding to the time-frequency domain data, an amplitude value quartile, an amplitude value interquartile range, and a spectral entropy;
process the time-frequency domain data to obtain linear prediction coefficient (LPC) feature data representing a second feature of the radar echo signal, wherein in a manner to process the time-frequency domain data, the processor is further configured to:
re-arrange the time-frequency domain data to obtain a one-dimensional row vector; and
input the re-arranged time-frequency domain data into an LPC function to obtain the LPC feature data;
input the signal attribute feature data and the LPC feature data into a behavior identification model; and obtain behavior information of the target from an output of the behavior identification model.

17. The computer program product of claim 16, wherein before processing the time-frequency domain data, the computer-executable instructions further cause the apparatus to perform a dimension reduction on the time-frequency domain data.

18. The computer program product of claim 17, wherein the computer-executable instructions further cause the apparatus to perform, based on a principal component analysis (PCA) algorithm, the dimension reduction on the time-frequency domain data.

19. The computer program product of claim 16, wherein the behavior identification model is a support-vector machines (SVMs) classifier model.

20. The computer program product of claim 16, wherein the behavior identification model is a neural network model.

* * * * *